United States Patent
Kotoc

[11] 3,782,111
[45] Jan. 1, 1974

[54] METHOD AND APPARATUS FOR GENERATING WASTE GASES

[75] Inventor: Stefan Kotoc, Prague, Czechoslovakia

[73] Assignee: Ustav pro vyzkum motorovych vozidel, Prague, Czechoslovakia

[22] Filed: Apr. 7, 1972

[21] Appl. No.: 242,074

[52] U.S. Cl............ 60/39.69, 60/269, 417/158, 431/115
[51] Int. Cl........ F23r 1/04, F02g 1/00, F02k 11/00
[58] Field of Search.............. 60/39.52, 39.69, 60/269; 417/158, 159, 171; 431/115, 116

[56] References Cited
UNITED STATES PATENTS

| | | | |
|---|---|---|---|
| 2,938,658 | 5/1960 | Foster | 417/171 |
| 2,280,447 | 4/1942 | Pearce | 417/158 |
| 2,686,473 | 8/1954 | Vogel | 60/270 R |

FOREIGN PATENTS OR APPLICATIONS

| | | | |
|---|---|---|---|
| 1,099,271 | 2/1961 | Germany | 60/39.52 |
| 167,774 | 8/1950 | Austria | 60/269 |
| 130,959 | 2/1951 | Sweden | 60/269 |
| 299,420 | 0/1936 | Great Britain | 60/39.52 |

Primary Examiner—Carlton R. Croyle
Assistant Examiner—Robert E. Garrett
Attorney—Murray Schaffer et al.

[57] ABSTRACT

This invention deals with a method for generating waste gases in which the chemical energy of a fuel supplied to a generator is released in the combustion chamber of the generator by the presence of an oxidant and due to the pressure, thermal and kinetic energy of the waste gases which, after expansion and acceleration, are led into an ejection and a contact area where exchange of energy takes place between the waste gases and the oxidant. The waste gases are then set in motion in a curvi linear path while at the same time transmission of the heat and motion of the oxidant which is sucked into and mixed with the waste gases in the contact area and in which area a part of the so called working medium, compressed by centrifugal force is braked by a diffusion means and guided back into the generator combustion chamber as oxidant for changing the chemical energy of the fuel into another form of energy while the remaining portion of the working medium is supplied to exhaust where it is put to a desired use, such as operating turbines, jet reactors, and the like or used to heat kettles or reactors and the like.

12 Claims, 3 Drawing Figures

METHOD AND APPARATUS FOR GENERATING WASTE GASES

A generator for carrying out the method includes a combustion chamber, a jet generator, a suction branch, a mixing chamber, a slot chamber and an exhaust manifold and associated parts.

BACKGROUND OF THE INVENTION

The invention relates to a method for generating and utilizing waste gases in a generator in which there is an automatic and constant passage of the working medium and where at the same time there is created on the outlet of the generator a stream of waste gases under high pressure which have great inherent thermal and kinetic energy. The waste gases from these generators are supplied to appropriate consumers such as, for example, vehicular combustion engines, turbines or jet reactors; or thee waste gases can be supplied to thermal consumers, such as, for example, kettles or reactors and the like.

Waste gas generators of this type generally comprise as open a system as possible with a stationary, that is, a constant flow and an external source of energy created by the combustion of fuel in the combustion chamber. The combustion process which takes place in the combustion chamber is usually supplied with air by means of a compressor, a fan, or by a direct supply of air through an inlet mechanism on the combustion chamber. The streaming of air into the combustion chamber may also be principally achieved by a pressure difference on the inlet and outlet mechanism of the chamber and is generally achieved by pressure pulsations or by the difference of the specific weight of the cold ingress air and the warmed air in the chamber. Known generators of this type, both stationary or mobile, and their drive units usually consist of a combustion chamber, a compressor and a turbine. In order to accomplish high specific output and efficiency, there is usually employed in these devices compressors which compress the air in many stages before it is introduced into contact with the waste gases, which have a high temperature and which pass through several stages of expansion in a gas turbine which drives a compressor. As a result, such a waste gas generator (also called a turbo-compressor) make jet engines, prop-jet engines or combustion turbines of vehicles in which they are employed, highly expensive and are the most troublesome part of such devices from an operating viewpoint.

It is the object of the present invention to provide a method of waste gases generation, as well as the generator for the execution of the method according to the present invention which overcomes the above-mentioned disadvantages and provide substantially improved properties and characteristics in comparison to the known devices.

Moreover, it is an object of this invention to provide a waste gas generator which forms an integral part of the working medium system and yields heat and takes off heat from that system in a recurrent regenerative cycle.

SUMMARY OF THE INVENTION

The method of generating waste gases according to the invention comprises changing the chemical energy of the fuel supplied to the generator in the combustion chamber thereof in the presence of an oxidant into waste gases having pressure, thermal and kinetic energies. The waste gases so formed after expansion and after acceleration in the accelerating chamber of the generator are guided into an ejector chamber and into a contact exchanger chamber for exchange of the energy between the waste gases and the oxidant. The contact chamber is substantially in the form of a curved slot chamber setting the waste gases in motion and simultaneously transmitting heat and motion to the oxidant. The oxidant is sucked into the contact exchanger chamber by the ejector effect and is mixed with the waste gases. A part of the so created working medium is thereupon compressed by the centrifugal force and braked to a stop in the combustion chamber by diffusion after being split into a plurality of streams and passing through slotted openings in the contact exchange chamber and then is guided back into the combustion chamber as oxidant in a combined, single stream for changing the chemical energy of the fuel into other types of energy. At the same time a second part of the working medium is taken from the slot chamber and supplied to a consuming means, such as a turbine, jet reactors, reaction kettles or reactors, and the like for use of its pressure, kinetic and thermal energies where the first cycle of the energy changes and of the transfers is used as an external source of energy.

Full details of the present method and apparatus follow herein and will be seen in the accompanying drawings.

THE DRAWINGS

In the annexed drawings there is shown an example of a generator of waste gases according to the invention and the method of its use.

FIG. 1 there is a schematic, radial, cross sectional, elevational view through a generator in accordance with the invention;

FIG. 2 is a cross sectional view in elevation showing in detail one form of starting means employed when using compressed gases to start the generator; and FIG. 3 is a partial view in elevation and partial section showing a plurality of generators of the invention employed with a turboprop jet air-craft engine.

DESCRIPTION OF THE PREFERRED EMBODIMENTS

Figure 2:
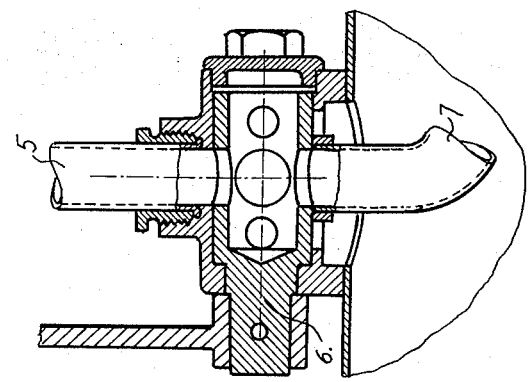

The method comprises, preferably, the continuous delivery of fuel into the combustion chamber, whenever there is created a gaseous medium which has a pressure and temperature which can be determined in advance and which includes the mixing of the mentioned gaseous medium with air containing oxygen. This brings about an increase in the temperature and the pressure of the air. At the same time a raising of the pressure of the mixture of the gaseous medium and of the air is achieved by a centrifugal force during a curvilinear streaming. Thereafter the mixture is braked and split by diffusion means into a plurality of streams. At least a part of the streams of the mentioned mixture of gaseous medium and air are then collected in the combustion chamber in a combined single stream at increased pressure and temperature, so that there takes place in the combustion chamber an automatic ignition of fuel supplied thereto while at the same time an expulsion of the rest of the mixture of the gaseous medium and hot compressed air in the working device is passed to an exhaust to be consumed as a working energy medium as mentioned above. As mentioned herein before, the mixing of the gaseous medium with air is performed in an ejector chamber and in a slot chamber, as well as eventually, after insertion, in the combustion chamber, all of which spaces or chambers have on both ends thereof open inlets and/or outlets and to which chambers the gaseous medium is supplied in an undirectional axial stream, which creates a vacuum in the ejection chamber and causes air to be sucked into the inlet and/or outlet openings of the various chambers. As mentioned above, part of the mixture is returned to the combustion chamber and this is deflected from the inner periphery of the curvilinear streamed medium.

In order to start-up the waste gases generator, a number of means can be employed. For example, one or more rocket cartridges or one or more small pressure cylinders with compressed gas or compressed gas from an external source, or generated by a fan or supplied through a mechanical compressor (none of which are shown in detail) may be used. The starting medium may also be supplied into the ejector chamber through the outer jacket of a generaor jet or by means of a generator blade device (neither of which are shown).

A generator of waste gases suitable for the execution of the disclosed method steps generally comprises means for the acceleration and the expansion of the medium located beyond the combustion chamber generally formed by one or more jet means or by a cascade means. The ejector chamber, the mixing chamber and the slot chamber or the outlet piping of the ejector are provided with deflecting blade means and/or a screen (not shown) and channels or slot means are formed by blade means located in the mixing chamber, a channel or a piping device are the slot means so formed providing a diffusing means for the generator. The combustion chamber of the generator may be made to accomplish a parallel flow pattern on a transverse or annular chamber configuration.

The generator may include several mixing or slot chambers which have a curvilinear flow path, as well as a plurality of combustion chambers and generating jets and ejectors connected in series in order to achieve a greater degree of compression and in order to achieve a relatively greater passage of waste gases. The generator may include also an inertial deflecting blade means for the stabilization of the flow and to guard against or prevent the occurrence of undesirable dynamic phenomena of the gases. In addition, for power take off the drive of electrical systems or for the fuel or other accessories, an inertial blade means may be used. The generator may also include in the combustion chamber a heated stabilizing means which may be heated by the waste gases themselves, or from an outer source in order to stabilize the combustion. A vane valve or a compressor may also be used in the starting generator or for purposes inducing a starting stream or a complementary medium stream as well. The generator may further include an orifice plate, a flap valve or a blade throttling mechanism located in its suction branch or in its outlet piping in order to control the power output and to stabilize the operation and the flow of the gases. For the same purposes, the slot chamber of the generator may be provided with a plurality of swiveling slot vanes or may include diffusion means provided with controlable cross sectional areas and characteristics. Finally, the slot chamber, that is, the space in which compression by the centrifugal force takes place, may contain an arrangement for a continuous, controlable change of the curvature of the medium flow path.

One particularly important advantage of the method for the generation of waste gases according to the invention and also of the generator itself resides in the fact that there is no need to compress the gas with separate mechanical arrangements and, therefore, no need for the use of large and expensive compressors. The waste gases formed in the generator have a greatly increased temperature and kinetic energy and they may be used directly as a source of engine energy. An additional advantage resides in the fact that both the generator and the engine which are supplied by the waste gases are of simple design, light in weight, have few movable parts, exhibit greater efficiency and have a great power output. Moreover, their principle operation is very simple.

Figure 1:
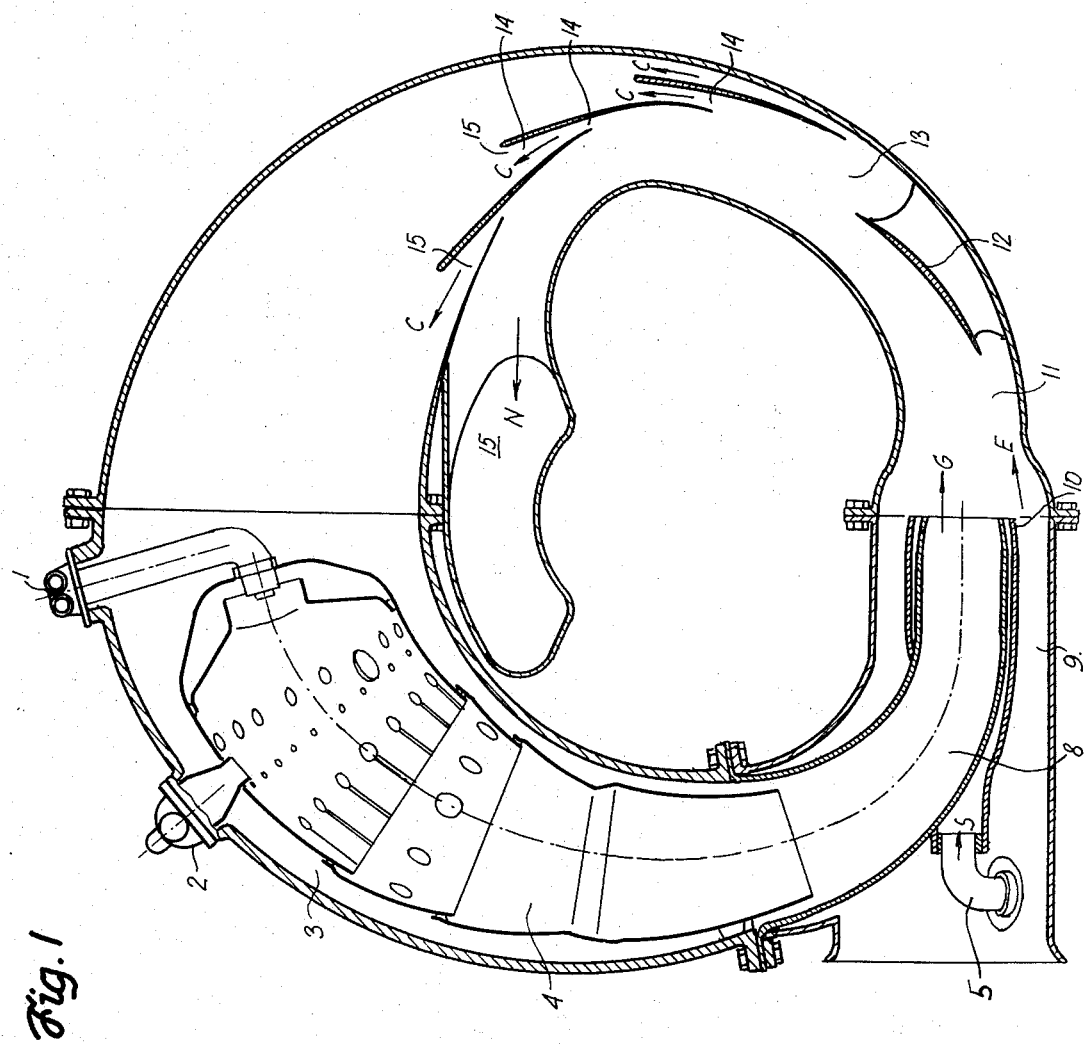

Referring now more particularly to FIG. 1, the generator shown comprises a combustion chamber 3 which includes a burner or flame tube 4, a generator jet 8, a suction branch 9, a mixing chamber 11, a slot chamber 13 and of an exhaust manifold 15. The combustion chamber 3 is provided with a fuel inlet jet 1 and with an arrangement (not shown) to supply an appropriate gas or liquid fuel for combustion in a gas mixture having higher temperature. The end of the combustion chamber leads into the generator or jet 8 which in turn leads into the ejector area or zone and into the mixing chamber 11. The ejector zone is formed by jet 8, suction branch 9 and mixing chamber 11.

The generated waste gases stream in the mixing chamber 11 by way of the jet 8. The stream of gases carries with it air which is sucked in through the suction branch 9 and then pases into the slot chamber 13 via the mixing chamber 11. The waste gases are mixed with the air, aided also by means of a mixing mechanism 12 to form a homogeneous mixture of the working medium which flows as far as possible with a homogeneous speed into the slot chamber 13. The jet 8, the suction branch 9, and the mixing chamber 11 form together as mentioned above an ejector area or zone the function of which is to insure the needed excess of air during combustion in the combustion chamber. The slot portion 13 of the generator is provided with slots formed by vanes 14 to diminish any unsuitable turbulence which arises by the mutual action (interaction) of the liquids which have considerably different speeds and which generally occur where waste gases flow from the jet 8 at great speeds in comparison to air being sucked in.

In addition, jet 8 is provided with a jacket 10 which is connected on one end with pipe 5 which provides an inlet for the starting medium as shown in greater details in FIG. 2 and on the other end to the outlet of the jet 8 forming a common opening with the jet and opening into the ejector area or zone and into the mixing chamber 11 which also forms part of that zone. The starting means is further provided with a valve 6 and with a starting medium source by way of an inlet pipe 7. As a source for the starting medium can be used booster rockets or small pressure cylinders of compressed gas such as oxygen can be used as starting means or medium. Valve 6 shown in FIG. 2 is replaced by an ignition arrangement in those cases where booster rockets are used.

OPERATION

The described generator operates as follows. Following starting through ignition by means of one of the usual starting means or arrangements mentioned above such as one or more rockets or with passing by way of valve 6 when it is opened, a stream of starting medium is formed which has a relative high kinetic energy so that reliable ignition in the combustion chamber is certain.

The stream S of starting medium flows through the jacket 10 of the jet into the ejector area or zone and into the mixing chamber 11. During flow through the outlet from the jacket 10, there is created a highly favorable double ejection effect caused by the sucking in of the stream E by stream G comprising the medium from the jet 8 and from the combustion chamber 3. Consequently, there is created an intensive first stream of medium flowing in a desirable direction throughout the entire generator.

In the mixing chamber 11, a complicated effect comprising an interchange of motive and thermal energy between the stream of starting medium and the stream of the sucked in air, E, takes place. During starting the gas stream G sucked in from the jet 8 and from the combustion chamber 3 also particpates in this effect. Under the influence of their kinetic energy, the streams S and E, as wellas G, flow into the mixing chamber 11 thereby becoming mixed and into the curvilinear slot chamber 13 where the mixture is compressed by centrifugal force and is split into several streams C by means of the slots formed by the vanes 14. The rest of the mixture flows out from the generator through the outlet piping N. The streams C which have been withdrawn and slowed down by the slots are joined in the front part of the combustion chamber 3 so that a relatively slow stream of relatively low pressure is formed and directed on through the combustion chamber. Due to the pressure drop, which is generated by the centrifugal compression and by diffusion which causes braking of the individual streams C there is formed an additional flow of initial mixture of air and starting medium into the combustion chamber 3, while at the same time, in the case of a suitable predetermined flow rate the fuel jet 1 is opened and a predetermined supply of fuel is fed to the combustion chamber 3. The first ignition in combustion chamber 3 is performed by means of a spark plug 2. However, the first ignition takes place automatically in the case where booster rockets are used to create a starting stream having an extremely high temperature.

Ignition of the fuel in the combustion chamber 3 changes the fuel and the air particles into a gas having a high thermal energy which passes into and through the jet 8 by means of its kinetic energy. It flows as a stream G from the combustion chamber 3 into jet 8 and gradually fully replaces the starting stream S.

As mentioned above, the combustion chamber 3 may be designed as a parallel flow chamber or as a transverse or an annular chamber flow chamber.

Although part of the generator stream G which enters into the mixing chamber with the sucked in air is in a rather cool state, it has nevertheless a sufficiently high temperature and sufficient power to automatically continuously ignite the gas or liquid fuel during further cycles. However, in the event ignition does not take place, spark plug can be employed as a reserve arrangement.

The generating of the pressure drop of the medium in the front portion of the combustion chamber 3 and the consequent warming of the medium to the required temperature results in a continuous cycle and achieves a substantial steady state of operation a balance of delivery of a supply of fuel according to the needed energy of the medium flowing out of the generator.

In appreciating the high efficiency and the power output of the waste gas generator of this invention, it is to be understood that all the energy of the mixture of the waste gases and the air at those points downstream from the ejector area or zone, including the energy gained through the sucked in air as well as of the waste gases, that is, the so-cal led ejector efficiency is substantially completely utilized. The energy of the faster waste gases is used in the mixing chamber 11 and in the slot chamber 13 for accelerating of the air and as a useful power output in the arrangement shown and which is connected through the exhaust manifold 15 to a consumer of such energy. In the event there is a presence of an excess air in the combustion chamber, for example, a double amount in comparison to the stochiometric mixture or medium there will be present as recycling takes place a considerable amount of the oxygen which possesses a high kinetic energy. In any event, as already mentioned, the sucked in air atains in the mixing chamber, in mixture with the gaseous medium, the greatest possible kinetic energy. Consequently, an advantage of the method and of the device according to the invention resides in the fact that it enables media which have a relatively low kinetic energy output to release substantially their total kinetic energy by means of centrifugal forces. Therefore, in accordance with the invention, the ejector area or zone does not form an element which by its own limits of efficiency limits the efficiency of the entire device and which would result in only limited transmission of the kinetic energy and a specific relatively small power output.

In order to provide proper recycling or recirculation and balanced performance, it is necessary to withdraw such a quantity of the medium from the slot chamber through the slots which, under the given conditions of the load of the generator, that is, with respect to back pressure on the side of the exhaust, throttling of the sucking in branch and the admission of the fuel to the combustion chamber to insure a recirculation and balanced performance. This quantity is readily determinable by calculation for any given system taking into account the dimensions of the generator, the particular fuels and waste gases being cycled and their energy values. From the standpoint of control and in order to achieve the optimum cycling and balanced performance, the power output of the generator, measured by the amount and the condition of the medium in the exhaust piping and which is dependent on the particular adjustment of the slots, the admission of the fuel in the combustion chamber and the particular throttling properties of the sucked in air can be suitably adjusted by varying the slot openings. The medium, withdrawn through the slots and compressed by diffusion is heated up in the combustion chamber by the combustion of the fuel so that there results a flow through the jet having a kinetic energy which is substantially in a steady, balanced state. The combustion and the outflow of medium through the jet forms but one stage which is the last stage of the generator function and at the same time the first stage of the recirculation on recycling function. The last stage of the generator function forms the outlet for the unsplit portion of the basic stream which flows from the slot chamber into the exhaust piping for the performance of useful work.

In the comparison with presently known waste gas generators of the turbulent type, a generator according the invention exhibits many advantages. For example, the present construction permits the formation of highly energy-homogeneous split streams which result in high efficiency and stability of operation of the device. In addition, in a device according to the invention there is lower friction between the medium flowing through the device and the walls of the chambers and as a consequence of this smaller losses caused by turbulence and loss of kinetic energy. Moreover, a generator in accordance with the invention is flexible in design.

For example, a waste gas generator having a desired nominal output may be best achieved by a cyclic arrangement which can be easily connected in series or increased in size and capacity simply by the increasing the generator length vertically in relation to the plane of fluid flow of the generator stream, in which case the combustion chamber has a flat design which is very simple and easily adaptable to connect in series.

Figure 3:
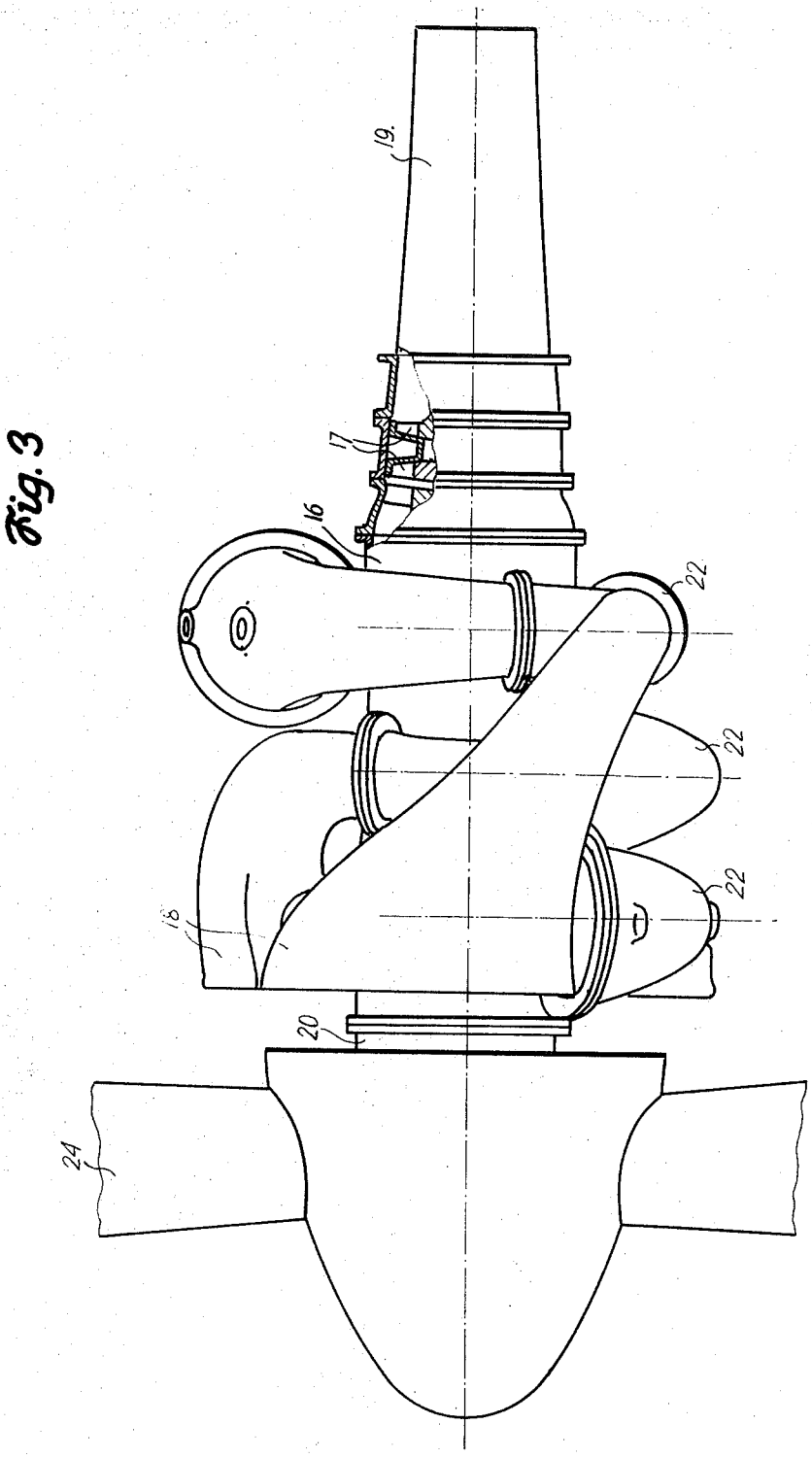

Referring now more particularly to FIG. 3, there is shown that an aircraft turboprop engine, having circularly connected thereto three generators such as that illustrated in FIG. 1. Their outlet piping is connected to a common header 16 enclosing turbine blades 17. The suction tubing of the generators is designated by 18. An exhaust manifold 19 extends from the rear end of the engine which is also equipped with a gear box 20 and an air-screw 21.

In a similar manner the illustrated waste gas generator can be assembled with a jet engine in which the turbine and the air-screw are replaced by a jet reactor of a stationary combustion chamber.

The particular design of the main parts of the generator, such as the sucking and exhaust headers may be modified to properly mate with the engines.

The use of a waste gas generator according to the invention as a source of energy for heating kettles or defined space may be easily realized. The suction and the exhaust piping of the generator, as well as the other parts, may be complemented by deflecting blade arrangement in order to provide for stream regulation and may be modified in shape, suitably adapted to the specific use.

Waste gas generators according to the invention, as well as the operating method accomplished by these generators may also be used to achieve a recirculation of a considerable amount of waste gases and to exhaust a relatively great amount of air at a low temperature. In this regard, the generators also are suitable to serve as drive units for hovercrafts.

As mentioned before, waste gas generators according to the ivention eliminate the need for mechanical compression of the gases. This considerably decreases the complexity and the weight of the drive units. In use with combustion turbines, a considerable increase of the working temperature of the waste gases without the need to change the material of the turbine blades can be achieved. This is so since the highest temperature of the waste gases which come in contact with the heat resisting materials of the blades may be transmitted to the useful power output stages rather than contacting the blades. On the other hand, the generator turbine blades may be omitted and replaced by a medium flow. In using a waste gas generator according to the invention with a jet engine, the engine need not include any movable parts, such as nulti-stage compressors, which are driven by appropriate turbines. This is extremely advantageous.

Engines equipped with a waste gas generator according to the invention may be easily designed for the desired power outout and also for a total power output by assembling in series. They are practically without vibrations in use, being uniformly balanced and in a perfect harmony with the body of aircraft or other objects with which they are used. The engines have a much longer service life than presently known combustion turbines and require little maintenance. In this regard, since lubricating and cooling means are eliminated, their reliability is increased. The costs of engines equipped with generators of this invention is only a fraction of the costs of known engines equipped with turbocompressors.

Engines equipped with a waste gas generator according to the invention start easily since there is no need to overcome the inertial power of rotors which are usually included in konwn engines. Moreover, engines equipped with waste gas generators of the invention attain upon starting, instant the maximum output. Furthermore, since the waste gases circulate in the engine in a practically closed system, there is in the exhaust air only a relatively small amount of polluting and contaminating gases in comparison with the total power output of the engine.

It is to be understood that numerous modifications of the embodiment of this invention may be made without departing from the spirit and scope of the invention. Therefore, this invention is not to be limited to the embodiment disclosed herein except as defined in the appended claims.

What is claimed is:

1. A method for automatically and continuously operating a waste gas generator having high pressure, thermal and kinetic energies comprising the steps of supplying a working medium comprising waste gases from a combustion zone, flowing said working medium at an accelerating rate into an ejection zone and then into a mixing zone arranged downstream thereof in a curvillnear path to exert a centrifugal force thereon while expanding the working medium and while sucking an oxidant into said ejector zone by ejector effect and mixing said oxidant with said working medium while exchanging energy between said oxidant and said working medium to form additional working medium and while compressing the mixture in said mixing zone, splitting the mixture into a plurality of streams and flowing a first part of said streams from said mixing zone to exhaust for consumer use while flowing a second part of said streams into the combustion zone and forming a single stream thereof for use as oxidant material and for change of chemical energy in subsequent cycles.

2. A method as defined in claim 1 wherein an external energy source is used to circulate the first cycle of energy changes and transfers.

3. A method as defined in claim 2 wherein the external source of energy is compressed gas.

4. A method as defined in claim 2 wherein the external source of energy is supplied by rockets.

5. A method as defined in claim 1 wherein fuel is continuously delivered to the combustion chamber.

6. A method as defined in claim 1 wherein air is the oxidant sucked into the ejector zone by vacuum, said suction being caused by the flow of the working medium from the combustion zone to the ejector zone.

7. A method as defined in claim 1 wherein the part of the working medium flowed to exhaust for consumer use is taken from the inner periphery of the curvilinear stream of working medium.

8. A waste gas generator comprising at least one combustion chamber having a fuel jet leading thereto, at least one jet means into which said combustion chamber leads located beyond said combustion chamber, at least one ejector chamber onto which said jet means leads located beyond said jet means, at least one mixing chamber into which said ejector chamber leads located beyond said ejector chamber and at least one curved slot chamber into which said mixing chamber leads located beyond said mixing chamber, said slot chamber leading into said combustion chamber and to exhaust and consuming means, a suction branch leading to said jet means and an outer jacket means connected to said jet means at one end communicating with a source of starting medium.

9. A generator as defined in claim 8 including a flame tube located in said combustion chamber.

10. A generator as defined in claim 8 including mixing means located in the mixing chamber.

11. A generator as defined in claim 8 wherein the slot chamber is provided with a plurality of vanes to provide slot openings onto said combustion chamber.

12. A generator as defined in claim 8 wherein the chambers, suction branch and exhaust are open at both ends and are disposed in a curvilinear arrangement.

* * * * *